(12) United States Patent
Feucht

(10) Patent No.: US 8,457,853 B2
(45) Date of Patent: Jun. 4, 2013

(54) CIRCUIT CONFIGURATION FOR A SERIAL COMMUNICATION WITH WAKE UP FUNCTION

(75) Inventor: Thomas Feucht, Wimsheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 954 days.

(21) Appl. No.: 12/512,478

(22) Filed: Jul. 30, 2009

(65) Prior Publication Data

US 2010/0034243 A1    Feb. 11, 2010

(30) Foreign Application Priority Data

Aug. 1, 2008 (DE) .......................... 10 2008 035 920

(51) Int. Cl.
*B60T 17/22* (2006.01)
(52) U.S. Cl.
USPC .............. 701/70; 713/300; 713/310; 713/324
(58) Field of Classification Search
USPC ...................... 701/36, 37; 713/300, 310, 324
See application file for complete search history.

(56) References Cited

U.S. PATENT DOCUMENTS

| RE32,526 | E  | * | 10/1987 | Hochstein | 327/432 |
|----------|----|---|---------|-----------|---------|
| 5,534,848 | A | * | 7/1996 | Steele et al. | 340/517 |
| 5,812,796 | A | * | 9/1998 | Broedner et al. | 710/302 |
| 5,939,998 | A | * | 8/1999 | Caporuscio et al. | 340/3.4 |
| 6,240,478 | B1 |   | 5/2001 | Brickell | |
| 6,590,758 | B1 | * | 7/2003 | Friede et al. | 361/170 |
| 7,210,049 | B2 | * | 4/2007 | Disser | 713/324 |
| 7,231,533 | B2 | * | 6/2007 | Darmawaskita et al. | 713/323 |
| 7,409,567 | B2 | * | 8/2008 | Hammes et al. | 713/320 |
| 7,480,549 | B2 | * | 1/2009 | Sakurai et al. | 701/22 |
| 7,523,334 | B2 | * | 4/2009 | Marais et al. | 713/324 |
| 7,783,908 | B2 | * | 8/2010 | Bogovac | 713/323 |
| 2006/0168378 | A1 | * | 7/2006 | Muth | 710/106 |

FOREIGN PATENT DOCUMENTS

| DE | 29 49 513 C2 | 6/1981 |
|----|---------------|---------|
| DE | 199 47 407 C2 | 5/2001 |

OTHER PUBLICATIONS

Robert Bosch GmbH, "CAN Specification Version 2.0," 1991.*
S. Corrigan, "Introduction to the Controller Area Network (CAN)," Texas Instruments Application Report SLOA101A, Aug. 2002 [Revised Jul. 2008].*
German Office Action dated Apr. 16, 2009 including English translation (Twelve (12) pages).

* cited by examiner

*Primary Examiner* — Thomas Black
*Assistant Examiner* — Peter D Nolan
(74) *Attorney, Agent, or Firm* — Crowell & Moring LLP

(57) ABSTRACT

A circuit configuration for serial communication includes a first half for receiving and emitting sensing and/or actuating signals; a second half for receiving and emitting sensing and/or actuating signals, a two wire connecting line, which connects bidirectionally the first half and the second half of the circuit configuration; and a wake up switching device for waking up the first and second halves of the circuit configuration out of their standby mode without quiescent current. Independently of the switching state of the wake up switching device, a high level state at the output of a second low pass filter device holds a first switching device in its closing state, and a high level state at the output of a first low pass filter device holds a second switching device in its closing state, as a result of which a self-holding of the supply voltage is guaranteed.

10 Claims, 1 Drawing Sheet

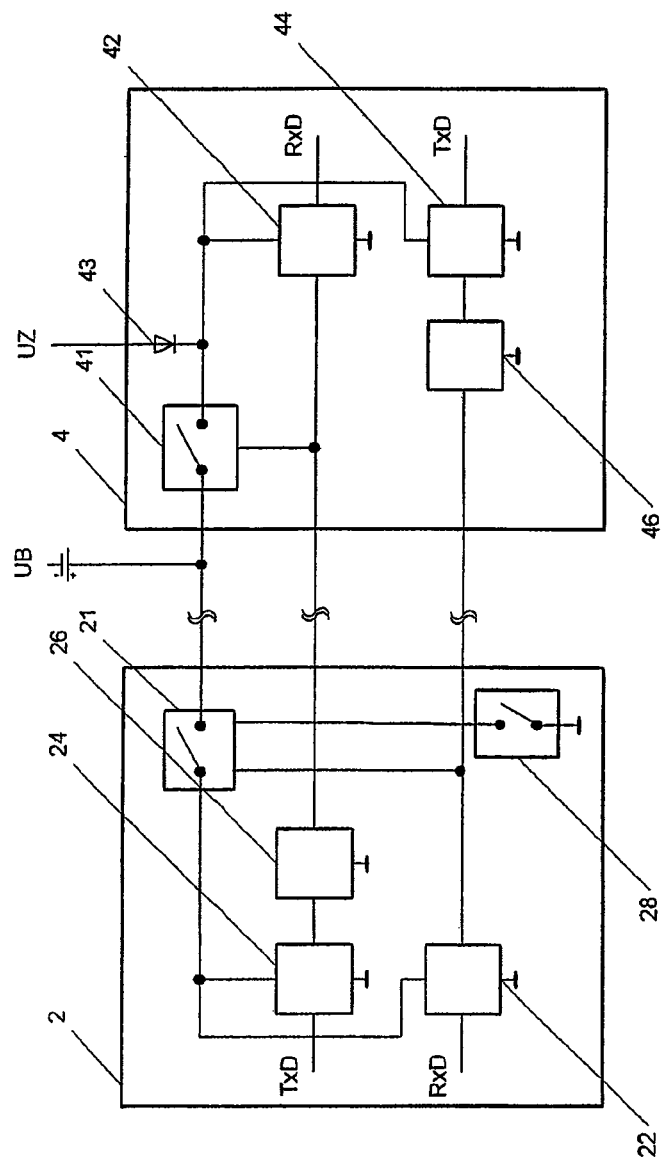

CIRCUIT CONFIGURATION FOR A SERIAL COMMUNICATION WITH WAKE UP FUNCTION

BACKGROUND AND SUMMARY OF THE INVENTION

The invention relates to a circuit configuration for a serial communication with wake up function and relates to, in particular, a circuit configuration without a quiescent current for a serial interface with bidirectional wake up function in a motor vehicle.

If a motor vehicle has electronic control units, intelligent sensors and actuators for sensing and controlling the operation of the vehicle, a wake up function is often provided in cases, in which the whole system is inactive or is in a standby mode, in order to be able to shift the involved subsystems out of their respective standby mode back again into a state of being ready for service. For such applications predominantly a LIN (local interconnect network) or a K line and/or a diagnostic interface with an awakening function, that is a wake up function, is used. These interfaces are the communication standards based on ISO standard 9141, where the communication is based on a bit serial single wire line in accordance with the SCI (UART) data format, and the maximum transfer rate is 20 Kbit/s.

The drawback with the aforementioned interfaces is, on the one hand, their implementation costs because of a certain complexity, for example, in the protocol based LIN interface that requires a driver, and, on the other hand, the constantly necessary quiescent current even in the off state, especially for the wake up function. This quiescent current has to be supplied continuously, in order to guarantee the wake up function, and, therefore, constitutes a load on the electrical system of the vehicle both with respect to the strain on the installed components and with respect to a lower reliable operational readiness of, for example, the parked vehicle.

Therefore, the object of the invention is to provide an inexpensive serial communication over an interface between a sensor and/or actuator subsystem and a central electronic control unit that makes a wake up function without quiescent current ready for use in a bidirectional manner.

The invention is based on providing an inexpensive serial communication between a sensor/actuator configuration and an electronic control unit at a transfer rate of up to 20 Kbit/s. The communication is able to wake up bidirectionally by providing a wake up switching device, which on the side of the sensor/actuator configuration shifts the sensor/actuator configuration out of a standby state without a quiescent current by connecting it to the supply voltage. This connection is communicated over a two wire line to the control unit, which in turn also leaves its standby mode. This departure of the control unit from its standby mode is then communicated to the sensor/actuator configuration over the two wire line, so that at this time a self-holding of the supply voltage is achieved by holding the respective states of the supply voltage switches independently of the position of the wake up switching device.

Thus, this object of the invention is achieved by a circuit configuration for a serial communication, characterized by: (a) a first half of the circuit configuration for receiving and emitting sensing and/or actuating signals; (b) a second half of the circuit configuration for receiving and emitting sensing and/or actuating signals; (c) a two wire connecting line, which connects bidirectionally the first half of the circuit configuration and the second half of the circuit configuration; and (d) a wake up switching device for waking up the first half of the circuit configuration and the second half of the circuit configuration out of their standby mode without quiescent current.

Preferably, the first half of the circuit configuration includes a first switching device for switching a supply voltage of the first half of the circuit configuration, a first signal shaping device, which is connected to the first switching device and is intended for shaping a signal on a data receiving line of the first half of the circuit configuration, a first transistor device, which is connected to the first signal shaping device and which is intended for controlling a data communication on a data transmission line of the first half of the circuit configuration, a first low pass filter device, which is disposed in the data transmission line of the first half of the circuit configuration, and the wake up switching device.

In an especially preferred embodiment, the second half of the circuit configuration includes a second switching device for switching a supply voltage of the second half of the circuit configuration, a second signal shaping device, which is connected to the second switching device and is intended for shaping a signal on a data receiving line of the second half of the circuit configuration, a second transistor device, which is connected to the second switching device and which is intended for controlling a data communication on a data transmission line of the second half of the circuit configuration, and a second low pass filter device, which is disposed in the data transmission line of the second half of the circuit configuration.

In addition, the wake up switching device for waking up the first and the second half of the circuit configuration is designed preferably to shift the first switching device into a closing state.

Preferably, the result of shifting the first switching device into the closing state is that the first transistor device is supplied with an operating voltage, and an output of the first low pass filter device assumes a level in such a manner that the second switching device is shifted into a closing state. Preferably the result of shifting the second switching device is that the second transistor device is supplied with the operating voltage, and an output of the second low pass filter device assumes a level in such a manner that the first switching device stays in its closing state, independently of a switching state of the wake up switching device.

The first half of the circuit configuration is advantageously a sensor device, an actuator device or a sensor/actuator device.

In an additional advantageous design the second half of the circuit configuration is a central electronic control unit.

In an even more advantageous design, the first half of the circuit configuration is a part of a foot brake module of an electronic brake system in a motor vehicle, and the second half of the circuit configuration is a central electronic control unit of the electronic brake system in the motor vehicle.

The first half and the second half of the circuit configuration are also preferably digital circuit configurations, and the first and the second switching device are electronic switches.

The object of the invention is achieved with a method for waking up from a standby mode without quiescent current a first half of the circuit configuration and a second half of the circuit configuration, which are connected by way of the communication lines and which form a bidirectional full duplex communication interface with a transfer rate of up to 20 Kbit/s, by means of a wake up switching device, characterized by the steps: (a) shifting the wake up switching device into a closing state, (b) shifting a first switching device in the first half of the circuit configuration into a closing state, (c) supplying a first transistor device with an operating voltage, (d) shifting an output of a first low pass filter device into a high level state, (e) shifting a second switching device in the second half of the circuit configuration into a closing state, (f) supplying a second transistor device with an operating voltage, and (g) shifting an output of a second low pass filter device into a high level state; wherein then independently of the switching state of the wake up switching device, the high level state at the output of the second low pass filter device holds the switching device in its closing state, and the high level state at the output of the first low pass filter device holds the second switching device in its closing state.

The invention is described in detail below by means of one preferred embodiment with reference to the drawing.

BRIEF DESCRIPTION OF THE DRAWING

The single FIGURE is a simplified drawing of a circuit configuration of a serial interface with a wake up function for sensors and actuators.

DETAILED DESCRIPTION OF THE DRAWING

On the left side of the FIGURE the reference numeral 2 denotes a sensor and/or actuator device, for example, a foot brake module that is part of an electronic brake system in a commercial vehicle and that is intended for sensing and/or triggering a brake action in accordance with a request of the driver. The reference numeral 21 denotes a first switching device in a sensor and/or actuator device 2, for example, an electronic switch. The reference numeral 22 denotes a first signal shaping device for shaping and processing sensed data, received by way of a receiving data line section RxD of the sensor and/or actuator device 2, and/or control data, which are to be emitted on a data transmission line section TxD of the sensor and/or actuator device 2, that is, a Schmitt trigger, which reshapes and reconstructs the signals, which have been distorted by a low pass filter device located in the line section. The reference numeral 24 denotes a first transistor device and/or an amplifier device for outputting the control data to a physical actuator by way of the transmission line TxD, and the reference numeral 26 denotes a first low pass filter device. Finally, the reference numeral 28 denotes an awakening or wake up switch.

In the sensor and/or actuator device 2 the first signal shaping device 22, the first transistor device 24, the first low pass filter device 26 and the wake up switch 28 are connected in each case to a ground potential, for example, the vehicle body.

Furthermore, the first signal shaping device 22 in the sensor and/or actuator device 2 is connected to the first switching device 21 and the first transistor device 24. The first transistor device 24 is arranged so as to lie in the data transmission path TxD of the sensor and/or actuator device 2 and is connected to the first low pass filter device 26, which is also arranged so as to lie in the data transmission path TxD of the sensor and/or actuator device 2. In addition, the first switching device 21 is connected to both the data receiving path RxD of the sensor and/or actuator device 2 and to the wake up switch 28.

Working on this basis, the sensor and/or actuator device 2, depicted on the left in the FIGURE, is connected by way of at least three connecting lines to a central electronic control unit (ECU) 4 (depicted on the right in the FIGURE), that is, to a control unit of the electronic brake system.

Furthermore, in the central electronic control unit 4, which is depicted on the right in the FIGURE, a second switching device, for example, an electronic switch, is denoted by the reference number 41. The reference numeral 42 labels a second signal shaping device for shaping and processing sensing data, received by way of a data receiving line section RxD of the central electronic control unit 4, and/or control data, to be outputted on a data transmission line section TxD of the central electronic control unit 4, that is, a Schmitt trigger, which reshapes and reconstructs signals, distorted by a low pass filter device located in the line section. The reference numeral 44 denotes a second transistor device and/or an amplifier device for outputting control data to a physical actuator by way of the transmission line TxD, and the reference numeral 46 denotes a second low pass filter device. Furthermore, the reference numeral 43 denotes a diode configuration, by means of which in response to the driver's request an ignition voltage or operating voltage UZ can be applied, for example, to the central electronic control unit 4 by means of an ignition switch (not illustrated) of the vehicle.

In the central electronic control unit 4, the second signal shaping device 42, the second transistor device 44, and the second low pass filter device 46 are connected in each case to a ground potential, for example, the vehicle body.

Furthermore, the second signal shaping device 42 in the central electronic control unit 4 is connected to the second switching device 41, the diode configuration 43 and the second transistor device 44. The second transistor device 44 is arranged so as to lie in the data transmission path TxD of the central electronic control unit 4 and is connected to the second low pass filter device 46, which is also arranged so as to lie in the data transmission path TxD of the central electronic control unit 4. In addition, the second switching device 41 is connected to the data receiving path RxD of the central electronic control unit 4.

A first connecting line runs from the first switching device 21 of the sensor and/or actuator device 2 to the second switching device 41 in the central electronic control unit 4. Applied to this first connecting line is also a supply voltage UB, for example, a voltage of the electrical system of the vehicle as a battery voltage from a vehicle battery, in the range of 9 to 32 V.

A second and a third connecting line form the data receiving and the data transmission lines RxD and TxD and/or TxD and RxD between the sensor and/or actuator device 2 and the central electronic control unit 4. Therefore, a full duplex two wire line is realized by means of the second and third connecting line. A control unit, that is a controller (not illustrated), at the second and the third connecting line controls and processes the data communication running over these lines. It must be pointed out at this point that the proposed interface can be produced with standardized components that are known in the prior art, so that the results are advantageously low costs for the hardware to be installed.

The operating principle of this inexpensive serial communication between, for example, a foot brake module with the sensor and/or actuator device 2 and the central electronic control unit 4 of an electronic brake system in a commercial vehicle with a rate of up to 20 Kbit/s and with a bidirectional wake up capacity or rather awakening capacity is described in detail below.

The circuit consists of a full duplex serial interface, which makes possible a hardware sided awakening function (wake up function) with no quiescent current consumption.

The first switching device 21 in the sensor and/or actuator device 2 can be switched on both by means of the wake up switch 28 and by way of the data receiving path RxD of the sensor and/or actuator device 2. The second switching device 41 in the central electronic control unit 4 can be switched on by way of the data receiving path RxD of the central electronic control unit 4.

If the system is in a quiescent or standby mode without quiescent current and if by means of the wake up switch 28 of the sensor and/or actuator device 2 over the first switching device 21 the supply voltage UB is switched on for the first transistor device 24 and the first signal shaping device 22, then the output of the first low pass filter device 26 is on a high level.

This high level voltage signal on the data transmission line TxD of the sensor and/or actuator device 2 and/or the data receiving line RxD of the central electronic control unit 4 causes the second switching device 41 in the central electronic control unit 4 to be switched on. In this way, the second transistor device 44 and the second signal shaping device 42 are supplied with the supply voltage UB, as a result of which the output of the second low pass filter device 46 goes to a high level and holds the first switching device 21 in its closing state.

Hence, after the central electronic control unit 4 has been successfully awakened by means of the wake up switch 28 of the sensor and/or actuator device 2 over the connection between the data receiving line RxD and the first switching device 21 of the sensor and/or actuator device 2, then a self-holding of the supply voltage UB is guaranteed.

Thus, a wake up is possible in a bidirectional way by:

a) supplying the central electronic control unit 4 with the operating voltage UZ by way of the diode configuration 43 or by receiving a corresponding switch-on signal on the data receiving line RxD of the central electronic control unit 4, thereby supplying the second transistor device 44 with the operating voltage UB and by shifting the output of the second low pass filter device 46 into the high level state, as a result of which the first switching device 21 is switched on, and the sensor and/or actuator device 2 is supplied with the operating voltage UB.

b) supplying the first transistor device 24 of the sensor and/or actuator device 2 with the operating voltage UB by switching on the first switching device 21 over a switch-on signal on the data receiving line RxD of the sensor and/or actuator device 2, and by shifting the output of the first low pass filter device 26 into the high level state, as a result of which the second switching device 41 is switched on, and the central electronic control unit 4 is supplied with the operating voltage UB; or c) switching on the first switching device 21 of the sensor and/or actuator device 2 by means of a wake up switch 28 and by waking up the system in accordance with the above b).

If the sensor and/or actuator device 2 and the central electronic control unit 4 are to be switched off, then the output of the second low pass filter device 46 need only be set to a low level. As a result, the first switching device 21 is switched off by way of the connection between the first switching device 21 and the data receiving path RxD of the sensor and/or actuator device 2.

Moreover, the power supplied to the first transistor device 24 and the first signal shaping device 22 is interrupted with the operating voltage, and consequently the second switching device 41 is also switched off by way of a resulting low level at the first low pass filter device 26.

Thus, the invention proposes a cost effective serial communication in the form of a 1:1 connection between a sensor and/or actuator device 2, which can be, for example, a part of a foot brake module of a commercial vehicle, and a central electronic control unit 4 over a full duplex two wire line connection with a transfer rate of up to 20 Kbit/s and bidirectional wake up capacity that incurs negligible hardware costs and does not require any quiescent current in the off state. At the same time, a self-holding of the supply voltage following wake up is guaranteed. Moreover, the proposed solution provides a digital, protocol independent, interface that operates on the basis of hardware without a driver.

Modifications, which are similar to the detailed description of the invention, are readily apparent to the person skilled in this art and, therefore, need not be evaluated as a departure from the subject matter of the invention, as defined in the following patent claims.

TABLE OF REFERENCE NUMERALS 2 sensor and/or actuator device
21 first switching device
22 first signal shaping device
24 first transistor device
26 first low pass filter device
28 wake up switching device
4 central electronic control unit
41 second switching device
42 second signal shaping device
43 diode configuration
44 second transistor device
46 second low pass filter device

The invention claimed is:

1. A circuit configuration for serial communication, comprising:
a first half of the circuit configuration operatively configured to receive and emit at least one of sensing and actuating signals;
a second half of the circuit configuration operatively configured to receive and emit the at least one of sensing and actuating signals;
a two wire connecting line bi-directionally coupling the first half of the circuit configuration and the second half of the circuit configuration; and
a wake-up switching device operatively configured to wake-up the first half of the circuit configuration and the second half of the circuit configuration from a standby mode without quiescent current,
wherein the first half of the circuit configuration comprises:
a first switching device for supplying a supply voltage of the first half of the circuit configuration;
a first signal shaping device coupled to the first switching device, the first signal shaping device being operatively configured to shape a data signal on a data receiving line of the first half of the circuit configuration;
a first transistor coupled to the first switching device, the first transistor being operatively configured to control a data communication on a data transmission line of the first half of the circuit configuration;
a first low pass filter device operatively disposed in the data transmission line of the first half of the circuit configuration,
wherein the second half of the circuit configuration comprises:
a second switching device for switching a supply voltage of the second half of the circuit configuration;
a second signal shaping device coupled to the second switching device, the second signal shaping device being operatively configured to shape a data signal on a data receiving line of the second half of the circuit configuration;
a second transistor device coupled to the second switching device, the second transistor device being operatively configured to control a data communication on a data transmission line of the second half of the circuit configuration; and a second low pass filter device disposed in the data transmission line of the second half of the circuit configuration, wherein the wake-up switching device is operatively arranged in the first half of the circuit configuration and is operatively configured to shift the first switching device into a closing state, and upon shifting the first switching device into the closing state, the first transistor device is supplied with an operating voltage and an output of the first low pass filter attains a level such that the second switching device is shifted into a closing state.

2. The circuit configuration according to claim 1, wherein the circuit configuration is configured such that upon shifting the second switching device into the closing state, the second transistor device is supplied with the operating voltage, and an output of the second low pass filter device attains a level such that the first switching device remains in the closing state independent of a switching state of the wake-up switching device.

3. The circuit configuration according to claim 2, wherein the first half of the circuit configuration is one of a sensor, an actuator, and a sensor/actuator.

4. The circuit configuration according to claim 3, wherein the second half of the circuit configuration is a central electronic control unit.

5. The circuit configuration according to claim 2, wherein the first half of the circuit configuration is part of a foot brake module of an electronic brake system in. a motor vehicle and the second half of the circuit configuration is a central electronic control unit of the electronic brake system.

6. The circuit configuration according to claim 1, wherein the first half of the circuit configuration is one of a sensor, an actuator, and a sensor/actuator.

7. The circuit configuration according to claim 6, wherein the second half of the circuit configuration is a central electronic control unit.

8. The circuit configuration according to claim 1, wherein the first half of the circuit configuration is part of a foot brake module of an electronic brake system in a motor vehicle, and the second half of the circuit configuration is a central electronic control unit of the electronic brake system.

9. The circuit configuration according to claim 1, wherein the first and second halves of the circuit configuration are digital circuits and the first and the second switching devices are electronic switches.

10. A method for waking-up from a standby mode without quiescent current a first half of a circuit and a second half of a circuit coupled via communication lines forming a bidirectional full duplex communication interface, the method comprising the acts of:

shifting a wake-up switching device arranged in the first half of the circuit into a closing state;

shifting a first switching device in the first half of the circuit into a closing state;

supplying a first transistor with an operating voltage;

shifting an output of a first low pass filter into a high level state;

shifting a second switching device in the second half of the circuit into a closing state;

supplying a second transistor with the operating voltage;

shifting an output of a second low pass filter into a high level state; and independent of a switching state of the wake-up switching device, holding the first switching device in the closing state via the high level state at the output of the second low pass filter and holding the second switching device in the closing state via the high level state at the output of the first low pass filter.

* * * * *